United States Patent [19]
Chellali et al.

[11] Patent Number: 5,878,119
[45] Date of Patent: Mar. 2, 1999

[54] IDLE SUPPRESSION AND SIGNAL THRESHOLD DETERMINATION THEREFOR

[75] Inventors: Adam Chellali, Richardson, Tex.; Andrew McGregor, Ottawa, Canada

[73] Assignee: Northern Telecom Limited, Montreal, Canada

[21] Appl. No.: 877,852

[22] Filed: Jun. 18, 1997

Related U.S. Application Data

[60] Provisional application No. 60/020,119 Jun. 20, 1996.
[51] Int. Cl.⁶ .................................................. H04M 11/00
[52] U.S. Cl. ................................. 379/93.08; 379/100.17; 358/468
[58] Field of Search .................. 379/93.01, 93.05–93.08, 379/93.14, 100.01, 100.17; 358/400, 407, 442, 443, 468

[56] References Cited

U.S. PATENT DOCUMENTS 5,493,610   2/1996   Suzuki et al. ...................... 379/100.17

*Primary Examiner*—Wing F. Chan
*Attorney, Agent, or Firm*—Foley & Lardner

[57] ABSTRACT

A compression technique is used to suppress the idle or silent portion of both stations in a facsimile transmission. Facsimile transmission is a half-duplex protocol resulting in considerable idle time for either the called terminal or the calling terminal. The invention provides a signal level threshold for each station whereby signals above the threshold are allowed to pass through while signal levels below threshold are not, resulting in more efficient network bandwidth utilization.

10 Claims, 3 Drawing Sheets

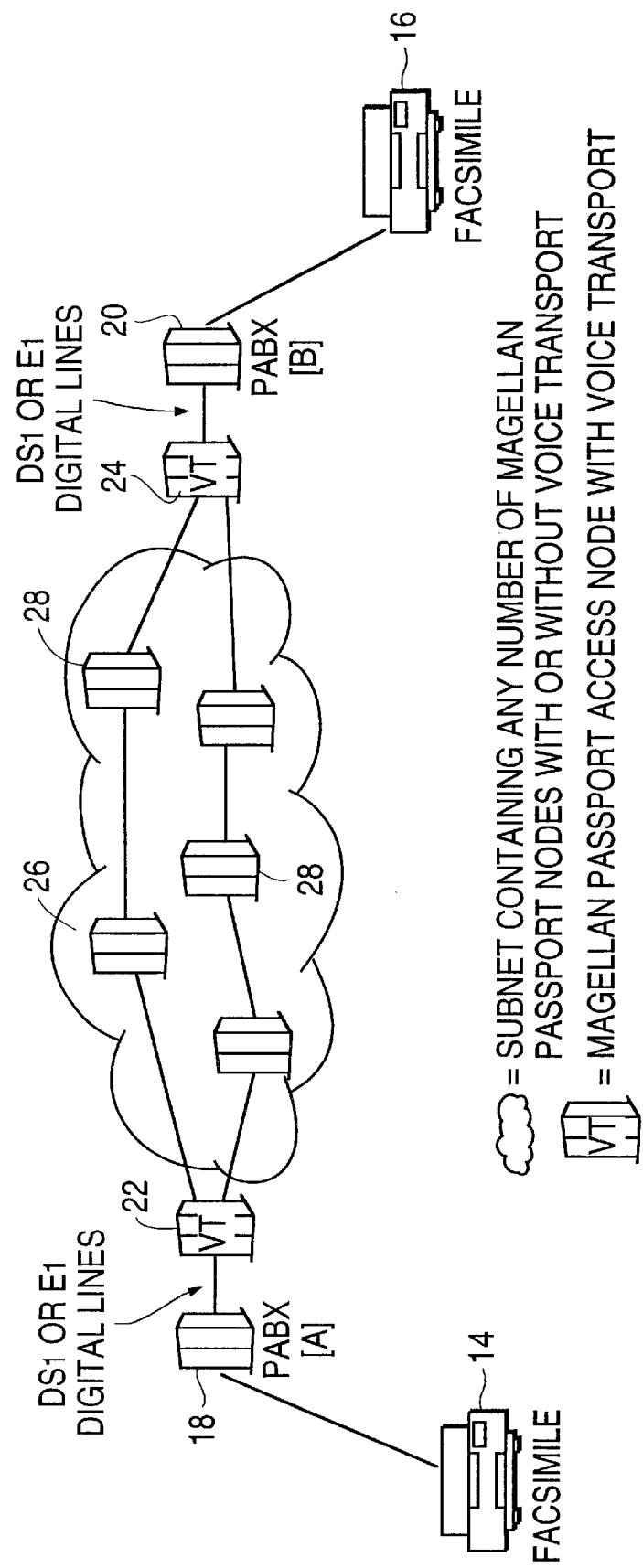

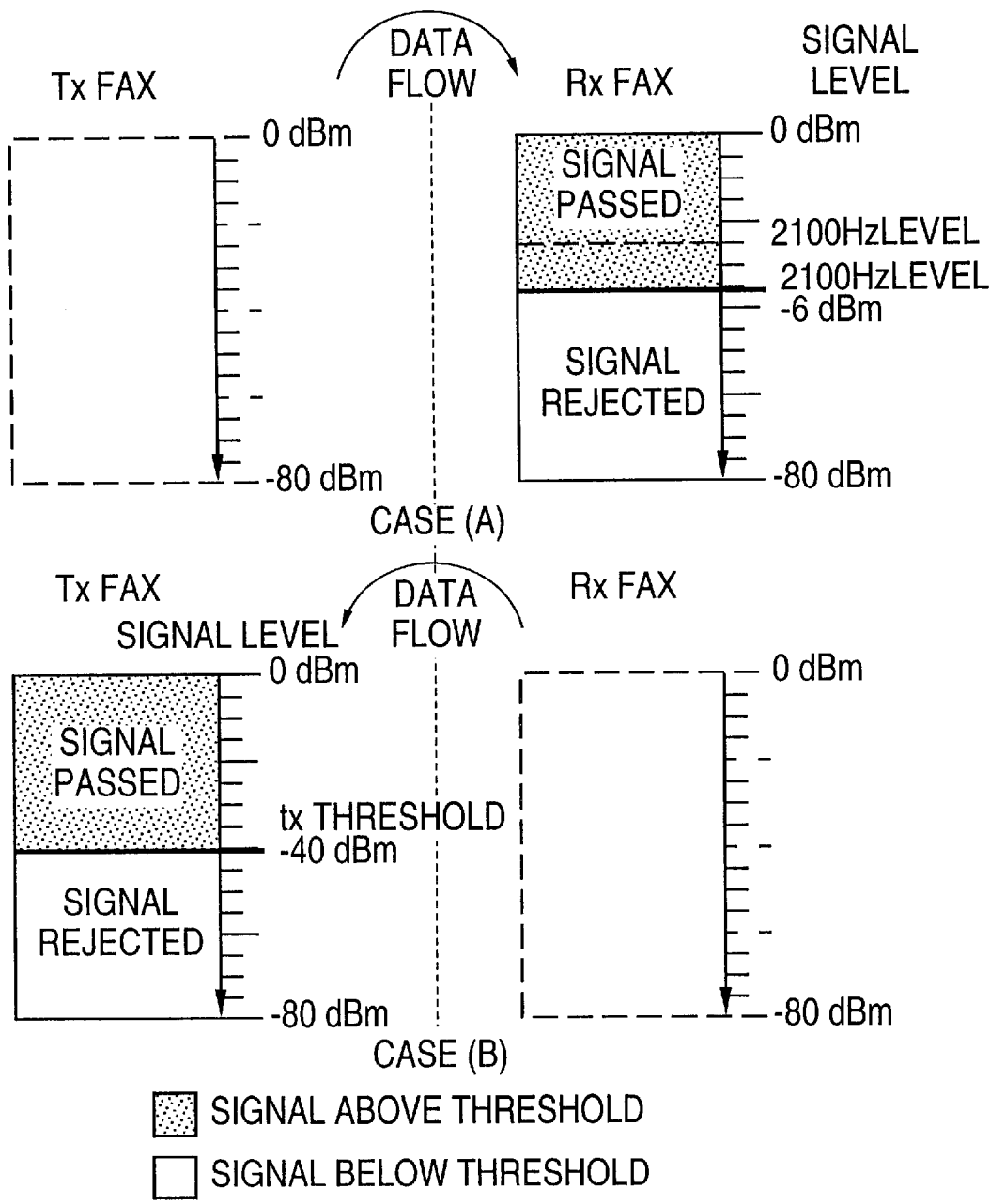

IDLE SUPPRESSION AND SIGNAL THRESHOLD DETERMINATION THEREFOR

This is a provisional application Ser. No. 60/020,119 filed Jun. 20, 1996.

FIELD OF THE INVENTION

This invention relates to bandwidth-efficient half-duplex data transmission via terminals such as facsimiles or modems and to a system and method of half-duplex data transmission realizing efficient use of bandwidth through cell-based networks.

BACKGROUND OF THE INVENTION

Facsimiles are well known for exchanging written time-critical information. Early facsimile standards, i.e., CCITT Group 1 (1960) and CCITT Group 2 (1976) established a relatively slow rate of transmitting data between terminals with times of 5 or 6 minutes per page being common. These standards are used rarely today but are still supported for backward compatibility. The current dominant standard is CCITT Group 3 which has boosted image quality and reduced transmission time to as little as 6 seconds per page. Group 1 and Group 2 standards use tonal signal for control and handshaking whereas Group 3 uses binary coded Frequency Shift Keying (FSK) signalling.

Modems are also used extensively for transmitting data over the public switched telephone network between terminals including computers and the like.

Facsimile transmission between terminals is half-duplex, meaning that only one of the two terminals is transmitting at any one time. During a typical facsimile connection, the transmitting (calling) terminal sends a calling (CNG) signal (a 1100 Hz calling tone) and the receiving (called) terminal replies with a called (CED) signal (a 2100 Hz called station identifier) and a digital identification signal (DIS) at 462 Hz. After the handshaking, which consists of a transmit digital command signal (DCS), a training signal and a received confirmation to receive (CFR), the calling facsimile starts transmitting the first page with compression according to CCITT (ITU) T.4. The called facsimile is silent at this time.

Systems such as Magellan Passport allows the carriage of synchronous digital data (voice and non-voice) over a cell-based Magellan Passport network. Magellan and Passport are trademarks of Northern Telecom.

Two techniques for compression or bandwidth saving are used for the data voice component in Passport: Adaptive Differential Pulse Code Modulation (ADPCM) and silence suppression. ADPCM compression is a means of looking at successive data and coding the difference instead of the data itself. Thus the number of bits representing a sample data can go from 8 to 4, 3 or 2 bits per sample. On the other hand, silence suppression uses knowledge of speech properties and dynamics to reduce transmission requirements.

OBJECTS OF THE INVENTION

Accordingly, it is an object of the present invention to apply compression techniques to facsimile or modem generated data so as to use the bandwidth more efficiently.

It is a further object of the invention to achieve bandwidth savings without compromising quality.

It is yet a further object of the present invention to determine the optimal signal suppression threshold for both sides of the facsimile stations to achieve the bandwidth savings.

SUMMARY OF THE INVENTION

Therefore, in accordance with a first aspect of the present invention there is provided a system for half-duplex data transmission between a transmitting terminal and a receiving terminal over a public switched telephone network. The system comprises transmitting switching means connected to the transmitting terminal and receiving switching means connected to the receiving terminal; the transmitting switching means and the receiving switching means exchanging data signal through the public switched network. The transmitting switching means has a first signal level detection means whereby only data signals above a first dynamic threshold level are transmitted to from the transmitting switching means to the receiving terminal.

In a preferred embodiment the transmit and receive terminals are facsimiles or modems.

In accordance with a second aspect of the invention there is provided a method of reducing the bandwidth requirement of a half-duplex, non-voice data transmission through a public switched telephone network. The method comprises: (a) transmitting the non-voice data from a data transmitting terminal to a first switching station having a first signal level detector, (b) conveying non-voice data from the first switching station to a second switching station through the telephone network, the second switching station having a second signal level detector, (c) determining signal threshold levels for respective level detectors based on the dynamic level of the non-voice data, and (d) setting the switching stations to pass data to respective terminals only if the data signal level is above the predetermined threshold levels.

In a more specific aspect of the invention the optimal threshold level for respective level detection is determined.

BRIEF DESCRIPTION OF THE DRAWINGS

The invention will now be described in greater detail with reference to the attached drawings wherein:

FIG. 2 is a block diagram of an exemplary network for transmitting and receiving voice and non-voice data according to one embodiment of the invention; and FIG. 3 illustrate relative receiving and transmitting signal threshold levels according to an embodiment of the invention.

DETAILED DESCRIPTION OF PREFERRED EMBODIMENTS OF THE INVENTION

Figure 1:
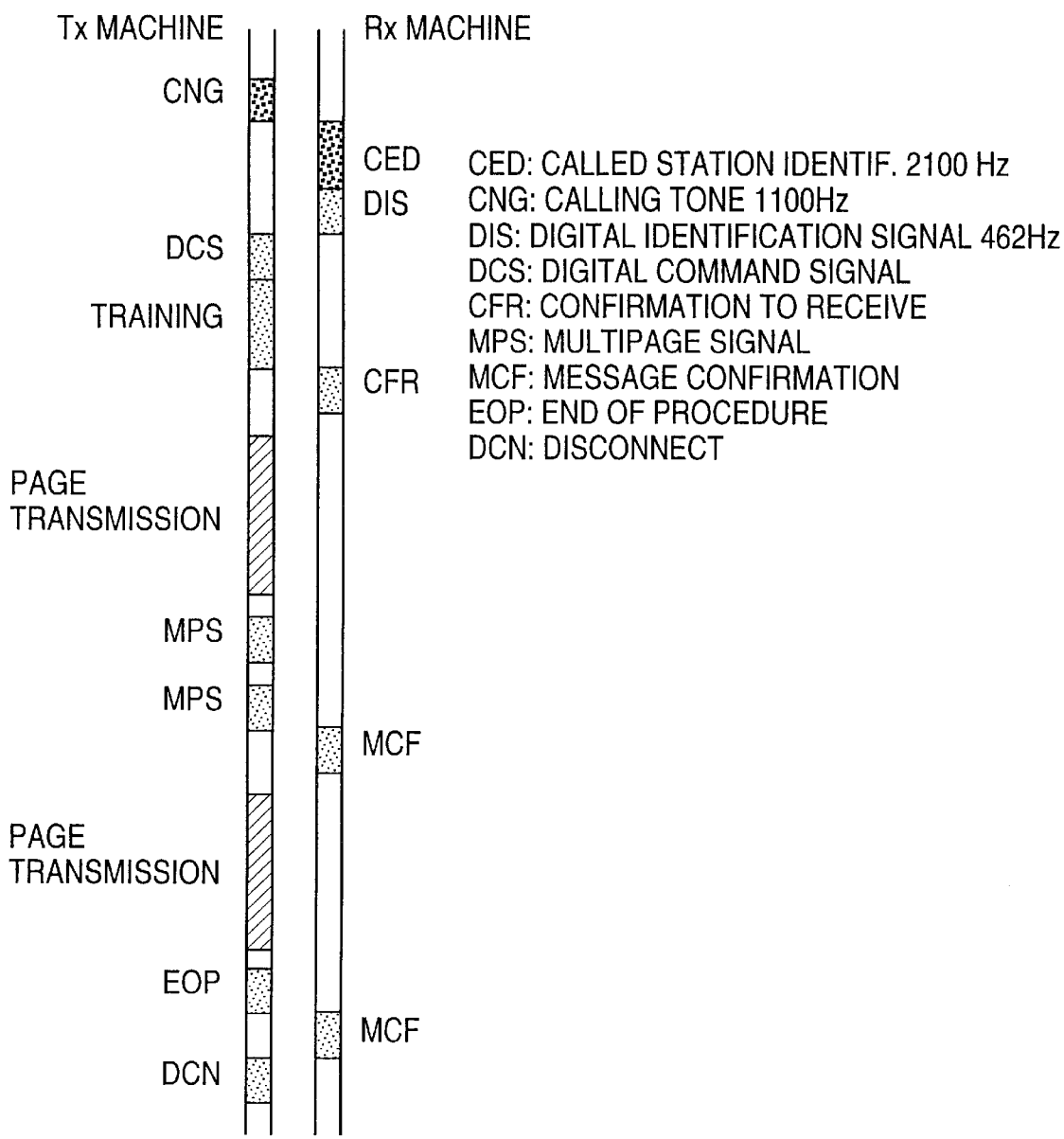
FIG. 1 shows the temporal relationship between known transmitting and receiving facsimile devices.

As previously discussed, facsimile transmissions are half-duplex and this is illustrated pictorially in FIG. 1. The left-hand vertical time bar shows the sequence of events which occur at a transmitting or calling facsimile terminal while the right-hand vertical time bar shows the corresponding activities at the receiving or called facsimile. The shaded areas represent the handshaking protocol, page transmission, message confirmation, etc. The blank regions represent no transmission or periods of time wherein the relative facsimile terminals are silent or idle. Under the current protocol, cells are sent through the network during the idle times even though no information is being communicated. The present invention seeks to avoid sending cells through the backbone data network during these idle times, thereby making significant savings in bandwidth.

The aforementioned silence suppression for voice transmission is known in the Magellan Passport architecture. It provides a variable bandwidth reduction by analyzing signals in a voice transmission system. Signals falling below a given threshold are considered silence and cells containing silence are not sent through the network.

In Passport, a tone detector determines from the 2100 Hz tone associated with a facsimile transmission that non-voice data is present. It is intended that, in the present invention, the 2100 Hz tone detected by the tone detector will be used by the DSP to enable facsimile idle suppression.

FIG. 2 shows one implementation of a telephone network for facsimile communication having facsimile idle suppression. As shown, the network includes facsimile terminals 14 and 16. It is to be understood that these terminals could also be modems. The network also includes PBX's or PABX's 18 and 20 associated with each facsimile terminal. Access switches 22 and 24 allow interconnection from the PBX's to the backbone network 26 which may contain, as illustrated, a plurality of nodes 28. In the illustrated embodiment the access switches 22 and 24 may be Magellan Passport units.

The facsimile idle suppression function and tone detection are performed in the switches 22 and 24, it being understood that when one facsimile unit including PBX and access switch is sending or calling, the other unit is receiving or called.

As indicated previously, the overall savings in bandwidth results from the suppression of bandwidth during the interval when the respective facsimile terminals are in an idle or silent mode. To ensure that the suppression is effective it is necessary to set threshold levels for the signals from both the receiving or called and transmitting or calling terminals. In the preferred embodiment there are two separate threshold levels, one at the transmitting end and one at the receiving end.

The implementation of facsimile idle suppression according to the invention should not impact on the normal operation of the facsimile functionality, i.e., the implementation is transparent to the facsimile station and must work correctly for all ITU compliant facsimile devices.

FIGS. 3A and 3B illustrate the threshold levels for the receiving terminal and transmitting terminal respectively. In each case the shaded area represents the situation where the signal is above the set threshold, in which the signal is considered valid data and passed through the network to the other end. The non-shaded area is the case where the signal is below the set threshold and the data is considered not valid, i.e., either idle signal during the silent period or the returning echo due to the hybrid and 4-wire to 2-wire conversion.

The determination of whether the station is the calling facsimile or the called facsimile is done at the tone detector in the access switch. The tone detector is essentially a bandpass filter centered around 2100 Hz. If the energy is detected at around 2100 Hz, then the station is the called station, otherwise it is the calling station.

The decision on whether the signal passes or not is based on the following:

if (signal_power>=threshold), signal sent (valid data)

if (signal_power<threshold), signal not sent or suppressed (data not valid)

The threshold at the transmitting facsimile or station is dynamic and determined from the average signal power of the 2100 Hz tone and the existing ITU standards.

If the incoming signal from the transmitting facsimile is greater than the 2100 Hz signal level of the receiving facsimile, and assuming a moderate echo return loss (ERL) the return echo at the receiving facsimile will be suppressed most of the time given the receiving threshold. The echo will not be suppressed in the case of very poor ERL (in the order of a few db) or in the case of a very high transmitting facsimile signal level versus very low receiving facsimile signal level.

If, however, the incoming signal from the transmitting facsimile is equal to or less than the 2100 Hz signal level of the receiving facsimile and with moderate ERL, only the receiving facsimile signal will be passed to the transmitting facsimile.

The threshold level at the receiving facsimile (FIG. 3A) is:

rx_threshold=2100 Hz_signal level-6 dBm.

This threshold value, i.e., 6 dBm below the 2100 Hz signal level, guarantees that all receiving facsimile signals will pass (signal higher than threshold) and all idle signals will not pass (signal below threshold). Also, any echo below the receiving threshold will be suppressed. The 6 dBm level is chosen because ITU standards allow a 6 dBm range for transmission levels. Thus for all ITU compliant all valid signals will be no quieter than 6 dBm less than the 2100 Hz signal emitted. The valid data from the receiving facsimile will always pass given the above receiving threshold value. Note that if the echo is greater than the minimum allowed signal level it will be transmitted, but this will be rare and will not stop the facsimile from proceeding successfully although there will be no bandwidth savings.

The threshold at the transmitting station (FIG. 3B) is fixed at −40 dBm. This value is chosen to reflect the ITU recommendation that signals from a facsimile terminal can be as low as −40 dBm. From ITU-T Recommendation V.2 and ITU-T Recommendation T.4, the mean signal power is about 15 dBm. With the loss in the network between subscribers, however, the signal can be as low as −40 dBm. This threshold level guarantees that all transmitting facsimile signals will pass.

As previously noted with reference to FIG. 1, a typical half-duplex facsimile transmission includes considerable intervals in which one or the other terminal is silent or idle. TABLE 1 shows a potential bandwidth saving on a facsimile transmission using the idle suppression protocol of the present invention. As indicated, the results are tabulated for different number of pages transmitted. From TABLE 1 it is apparent that for one page transmission the calling facsimile registers 80% of data present and 20% of idle data. The called facsimile registered 83% idle data and 17% data. The overall savings is: 103/200=51.5%.

TABLE 1

| # page | Transmitting Fax | Receiving Fax | FIS Ratio |
|---|---|---|---|
| 1 | 80% Data | 17% Data | 51.5% |
|   | 20% Idle | 83% Idle |   |
| 2 | 79% Data | 15% Data | 53.0% |
|   | 21% Idle | 85% Idle |   |
| 3 | 83% Data | 8% Data | 54.5% |
|   | 17% Idle | 92% Idle |   |

This result emphasizes that the facsimile call is, in fact, half-duplex and that when one side is in a data mode the other side is in an idle mode. Thus, the facsimile idle suppression technique of the present invention will result in a saving of about 50% in bandwidth which can be equated to an equal saving in facsimile transmission costs.

Although a particular embodiment of the invention has been illustrated and described, it will be apparent that various changes can be introduced. The scope of the invention is only limited by the appended claims.

In summing up, the compression technique of this invention, called Facsimile Idle Suppression (FIS) provides a variable bandwidth saving on facsimile calls. It uses knowledge of facsimile signal properties and dynamics to reduce transmission requirements. Since facsimile transmission is a half-duplex protocol suppressing the idle (silent) part on both sides of the connection can result in about 50% saving on the overall bandwidth.

We claim:

1. A system for half-duplex data transmission between a transmitting terminal and a receiving terminal over a public switched telephone network, comprising transmitting switching means connected to the transmitting terminal, receiving switching means connected to the receiving terminal, the transmitting switching means and the receiving switching means exchanging data signal through the public switched network; and the transmitting switching means having a first signal level detection means whereby only data signals above a first dynamic threshold level are transmitted to from the transmitting switching means to the receiving terminal.

2. The system according to claim 1 wherein the receiving switching means has a second signal level detection means whereby only data signals above a second dynamic threshold level are transmitted back from the receiving switching means to the transmitting switching means.

3. The system according to claim 2 wherein the receiving switching means have a tone detector for measuring the data signal at a predetermined frequency.

4. The system according to claim 3 wherein the second signal level detection means has threshold means for setting the second dynamic threshold level in response to the measured data signal of the tone detector.

5. The system according to claim 4 wherein the predetermined frequency is 2100 Hz.

6. A method of effectively utilizing the bandwidth of a half-duplex data transmission over a public switched telephone network comprising:

transmitting data signals from a data transmitting terminal to a first switching station having a first dynamic threshold level;

transmitting to a second switching station through the public switched telephone network only data signals having the signal level above the first dynamic threshold level; and forwarding the data signals to a data receiving terminal.

7. The method according to claim 6, comprising a further step of:

passing from the second switching station to the first switching station only data signals having the signal level above a second a dynamic threshold level.

8. The method according to claim 7, comprising further steps of:

detecting at the second switching station data signal being sent from the data receiving terminal to the data transmitting terminal;

measuring the signal level of the data signal from the data receiving terminal to the data transmitting terminal at a predetermined frequency; and setting the second dynamic threshold level in response to the measured signal level.

9. The method according to claim 8, wherein the predetermined frequency is 2100 Hz.

10. The method according to claim 7, comprising a further steps of:

measuring at the first switching station the level of the data signal being transmitted from the data transmitting terminal to the data receiving terminal; and setting the first dynamic threshold level in response to the measured level.

* * * * *